(12) United States Patent
Saeterbø et al.

(10) Patent No.: US 7,908,947 B2
(45) Date of Patent: Mar. 22, 2011

(54) ARRANGEMENT FOR DAMPING OF VIBRATIONS AND DEFECTION IN A TOOL HOLDER

(75) Inventors: Martin Saeterbø, Flatåsen (NO); Even Lund, Trondheim (NO)

(73) Assignee: Teeness ASA, Trondheim (NO)

( * ) Notice: Subject to any disclaimer, the term of this patent is extended or adjusted under 35 U.S.C. 154(b) by 411 days.

(21) Appl. No.: 10/595,600

(22) PCT Filed: Nov. 1, 2004

(86) PCT No.: PCT/NO2004/000330
§ 371 (c)(1),
(2), (4) Date: Apr. 28, 2006

(87) PCT Pub. No.: WO2005/042195
PCT Pub. Date: May 12, 2005

(65) Prior Publication Data
US 2007/0056414 A1 Mar. 15, 2007

(30) Foreign Application Priority Data
Oct. 31, 2003 (NO) .................................. 20034883

(51) Int. Cl.
*B23B 29/00* (2006.01)
(52) U.S. Cl. ............... 82/163; 82/904; 82/905; 408/143
(58) Field of Classification Search .................... 82/118, 82/157, 903, 904, 905, 163; 408/141, 143
See application file for complete search history.

(56) References Cited

U.S. PATENT DOCUMENTS

| | | | | |
|---|---|---|---|---|
| 3,172,308 A | * | 3/1965 | Shurtliff | 408/143 |
| 3,207,009 A | * | 9/1965 | Carlstedt | 408/143 |
| 3,230,833 A | * | 1/1966 | Shurtliff | 409/141 |
| 3,741,070 A | * | 6/1973 | Berthiez | 409/132 |
| 4,292,865 A | * | 10/1981 | Liu et al. | 82/158 |
| 4,417,489 A | * | 11/1983 | Liu | 82/1.11 |
| 4,616,738 A | * | 10/1986 | Shurtliff | 188/380 |
| 4,666,350 A | * | 5/1987 | Nicholas | 408/82 |
| 4,849,668 A | * | 7/1989 | Crawley et al. | 310/328 |
| 4,868,447 A | * | 9/1989 | Lee et al. | 310/328 |

(Continued)

FOREIGN PATENT DOCUMENTS
EP 0715092 6/1996

(Continued)

OTHER PUBLICATIONS

International Search Report for Application No. PCT/NO2004/000330, dated Mar. 8, 2005.

(Continued)

*Primary Examiner* — Jason Daniel Prone
*Assistant Examiner* — Jennifer Swinney
(74) *Attorney, Agent, or Firm* — Patterson & Sheridan, L.L.P.

(57) ABSTRACT

The invention relates to a device for damping vibrations and/or controlling the flexion of an object in machining, said device comprising at least one force exchange device which could be a force applying device or a damping device. A such force applying device is for applying a force having a force component directed at right angles to the surface of the object and/or for applying a moment to the object. A damping device of this type is for absorbing vibrations from the object and is adapted to absorb a force component directed at right angles to the surface of the object or to absorb a moment from the object.

21 Claims, 7 Drawing Sheets

U.S. PATENT DOCUMENTS

| | | | |
|---|---|---|---|
| 4,928,030 A * | 5/1990 | Culp | 310/328 |
| 5,086,564 A * | 2/1992 | Schalz | 33/1 M |
| 5,170,193 A | 12/1992 | McMillan et al. | |
| 5,291,975 A * | 3/1994 | Johnson et al. | 188/378 |
| 5,458,222 A * | 10/1995 | Pla et al. | 188/378 |
| 5,558,477 A * | 9/1996 | Browning et al. | 408/143 |
| 5,810,528 A * | 9/1998 | O'Connor et al. | 409/141 |
| 5,913,955 A * | 6/1999 | Redmond et al. | 82/1.11 |
| 5,939,816 A * | 8/1999 | Culp | 310/328 |
| 6,202,521 B1 * | 3/2001 | Rossetti et al. | 82/1.11 |
| 6,685,783 B1 * | 2/2004 | Nunes et al. | 148/563 |
| 6,694,213 B2 * | 2/2004 | Claesson et al. | 700/169 |
| 6,871,565 B2 * | 3/2005 | Allaei | 248/559 |
| 6,925,915 B1 * | 8/2005 | Claesson et al. | 82/133 |
| 6,954,686 B2 * | 10/2005 | Aubourg et al. | 701/3 |
| 7,050,883 B2 * | 5/2006 | Cho et al. | 700/188 |
| 2002/0033083 A1 * | 3/2002 | Claesson et al. | 82/118 |
| 2002/0083805 A1 * | 7/2002 | Lundblad | 82/1.11 |
| 2005/0051402 A1 * | 3/2005 | Schankin et al. | 188/379 |
| 2005/0067236 A1 * | 3/2005 | Conti et al. | 188/266.7 |
| 2005/0179178 A1 * | 8/2005 | Cropelli | 267/137 |

FOREIGN PATENT DOCUMENTS

| | | | |
|---|---|---|---|
| EP | 1 140 421 | | 1/2004 |
| JP | 61084433 A | * | 4/1986 |
| JP | 01098723 A | * | 4/1989 |
| JP | 04226812 A | * | 8/1992 |
| JP | 9-29503 | | 2/1997 |
| JP | 10055208 | | 2/1998 |
| JP | 11277308 A | * | 10/1999 |
| SE | 201682 | | 12/2003 |
| WO | WO 00/25963 | | 5/2000 |
| WO | WO 00/25964 | | 5/2000 |
| WO | WO 00/47408 | | 8/2000 |
| WO | WO 2006078189 A1 | * | 7/2006 |

OTHER PUBLICATIONS

Norwegian Search Report for Patent Application No. 20034883 dated Jul. 6, 2004.

* cited by examiner

ARRANGEMENT FOR DAMPING OF VIBRATIONS AND DEFECTION IN A TOOL HOLDER

TECHNICAL FIELD

The present invention relates to a method and an apparatus for vibration damping, and for damping flexing of tools and workpieces in machining.

BACKGROUND

Machining, such as turning, drilling or milling, frequently causes problems of vibrations and flexions, particularly when the length of the non-clamped or canti-lever part of the tool exceeds 4-5 times the diameter.

Figure 1:
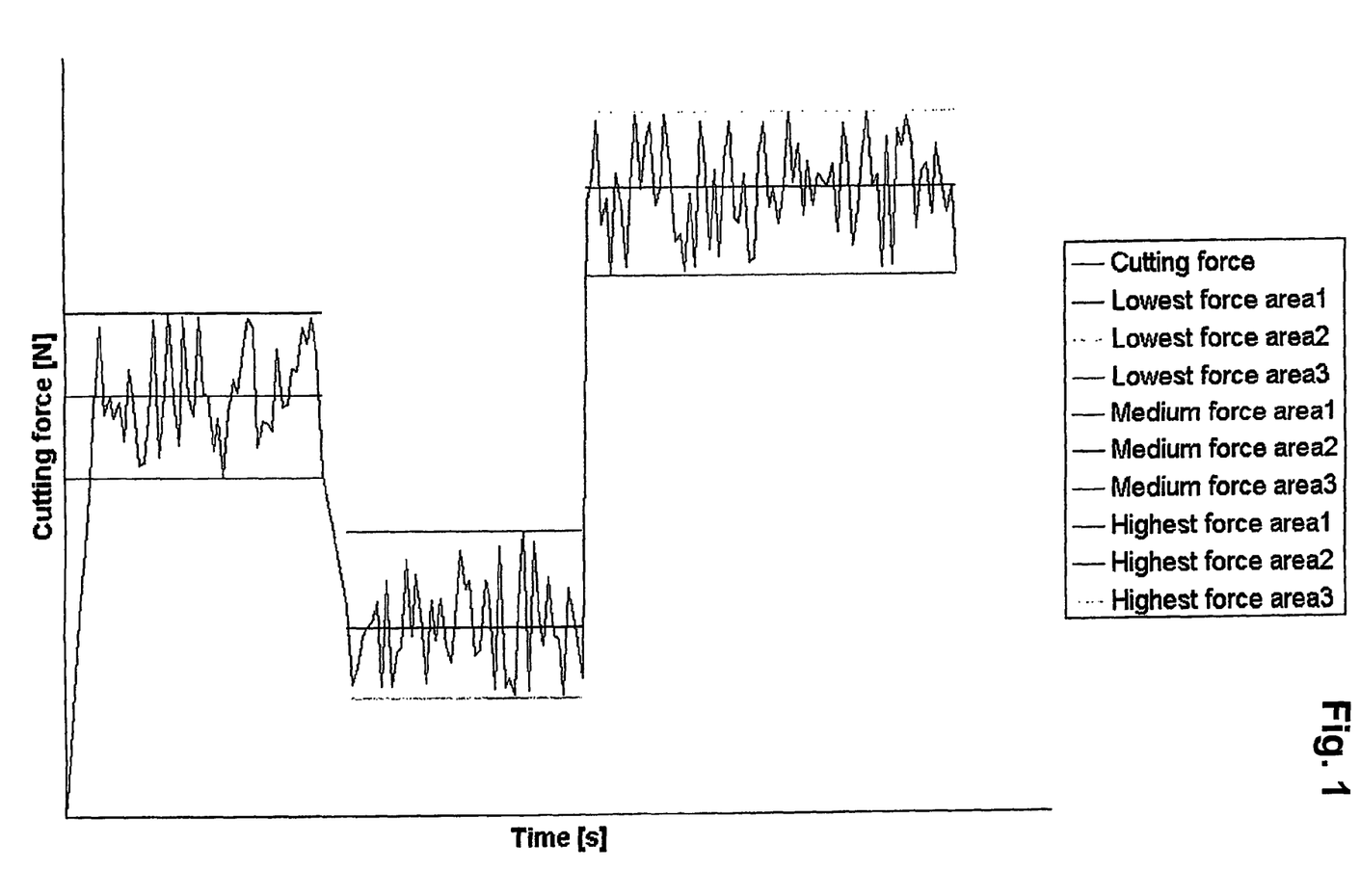
FIG. 1 is a graphic representation of several medium machining forces during machining, and variations thereof.

Vibrations and flexions are closely related. When applying the tooth to the workpiece there will first be a medium flexion caused by the cutting force applied to the tooth. When the tool is vibrating, a reciprocating motion will occur above and below the medium flexion (see FIG. 1). This motion will be amplified if the frequencies applied by the cutting force approaches the resonance frequencies of the tool.

Vibration problems usually occur in internal cutting, when deep cutting is intended and the possibility of increasing the diameter of the tool holder is low. Two types of vibrations are particularly problematic; flexional vibrations and torsional vibrations. These vibrations result in poor productivity, poor surface finish, reduced tool working life, and they often prevent machining.

Because of tool flexion, the intended dimension or the intended shape will not be obtained upon a cutting operation. By permitting adjustments of the medium flexion, one could come closer to the intended dimension or shape. One could also control the medium flexion to achieve a shape of the end product that otherwise would require a special tool.

Workpieces, particularly workpieces having a thin-walled cross section, are also subject to the same problems of medium flexion and vibrations. It is then usually the workpiece that flexes, while the tool is more at rest.

Vibration damping for machining has hitherto usually been performed by using passive mechanical dampers in which a mass of heavier material is supported in spring and damper elements (twin mass system) which in turn are supported in the tool (see U.S. Pat. No. 5,413,318, for example). The problem associated with mechanical dampers is i.a. that the heavy materials are expensive, each tool is limited to specific cantilever lengths and that the damper occupies space in the tool holder, thus weakening the tool. The materials oil and rubber are frequently used and they may be hard to obtain in a stable quality and they change properties with temperature and working life. In addition, such damping systems have limitations as to how low frequencies may be achieved. Also, twin mass dampers add an additional mass, hampering the balancing of tools rotating at a higher rpm.

Active dampening of tool holders may be achieved, for example, by using piezoelectric force actuators. Such force actuators have previously been used i.a. in passive electrical dampers, such as in shunted force actuators in skis, tennis rackets and golf clubs. In active systems typically a piezoelectric force actuator is used which is bonded or otherwise attached to or within the tool holder. The actuator will then transmit the force to the tool via shear forces. A control system, typically an adaptive regulating system, controls the actuator force by means of information from a sensor, typically an accelerometer. In order to be able to damp vibrations in such a tool in the best possible way, the actuator has to be located close to the tool holder clamp. The problem associated with the said locations of actuators is the fact that they do not allow flexibility along the length of the overhang. Also, the force transmission to the tool will be inefficient since these shear forces have to be very large in order to resist motions farthest out on the tooth tip.

The prior art comprises positioning of actuators directly onto or recessed in pockets on the tool holder, and the forces will then be transmitted from the actuator to the tool holder via shear forces. With such a clamping of actuators, one will be locked with respect to overhang lengths and force direction.

SUMMARY OF THE INVENTION

The invention solves or at least alleviates the problems of the prior art as referred to above.

According to the invention there is provided a device for vibration damping and/or controlling flexion of an object during machining, the device being distinguished by comprising at least one force exchange device for exchanging a force having a force component directed at right angle to the surface of the object and/or for exchanging directly or via a mechanical lever, a moment between the object and the device.

In an embodiment the device comprises a bending moment transmission device for transmitting a bending moment between the at least one force exchange device and the object. The bending moment transmitting device may comprise a force transmitting device surrounding the object. In a further embodiment the force exchange device could be disposed between a fixed support for the object and the force transmission device, and be attached to or recessed in the fixed support. Further, the bending moment transmission device may comprise a positioning device for the force exchange device, in which the positioning device surrounds the object, and the force exchange device may be disposed between the force transmission device and the positioning device. An elastic material could be disposed between the force transmission device and the positioning device. The elastic material could be disposed between the at least one force exchange device and the object, or between the at least one force exchange device and the positioning device. The elastic material could be made from rubber. The force exchange device could be configured to apply a force having a force component at right angles to the force transmission device while also parallel to the surface of the object.

In an alternative embodiment the device is provided with a positioning or locator device for the at least one force exchange device for fixing and positioning the force exchange device relative to the object. A force transmission device could then surround the object and be disposed between the force exchange device and the object. The force transmission device and the force exchange device could be located in the positioning device.

In yet an alternative embodiment the device could comprise a moment transmission device for transmitting moment between the at least one force exchange change device and the object, in which the moment transmission device is a connector part of the object for fixing the object to a clamp for the object. The force exchange device could then be disposed in the clamp for the object.

According to still another embodiment, the device could be movably disposed relative to the object. Further, the at least one force exchange device could be at least one actuator. The at least one force exchange device could be at least one actuator, and the device could comprise a control unit for regulating input to the at least one actuator. A sensor could be disposed on or in the object for detecting vibrations in and/or flexion of the object, and the control unit could receive signals from the sensor for regulating the input based on said signals. The sensor could be an accelerometer.

The actuator could be a shaker, a pneumatic and hydraulic actuator, a piezoelectric force-actuator or other force pressure or torsion actuator. Further, the actuators could be adapted to be passively controlled, such as by being in the form of pneumatic dampers or shunted actuators, and/or actively, such as by using a damping algorithm.

Further, the device according to the invention could be modular, permitting the use of different dimensions and geometrical configurations of the object. Also, the device could be adapted to an object which is a tool or a tool holder, possibly a workpiece.

Finally, two important and basic embodiments are noted, namely
that the at least one force exchange device is in the form of at least one force applying device for applying the force and/or for applying the moment to the object, and
that the at least one force exchange device is in the form of at least one damping device for absorbing vibrations from the object, said damping device being adapted to absorb the force component and/or absorb the moment from the object.

The present invention utilizes force exchange devices in the form of force applying devices and damping devices. As force applying devices actuators having a flexible fixing device (support) are preferably used, so that the actuators can be moved and the forces applied directly onto the tool holder or via a lever or force transmission sleeve(s). The advantage is the fact that the overhang of the tool and the direction of the force can be changed relative to the cutting forces occurring in the machining process, or it is desirable to apply a force in a distinct desired direction. The invention also permits using tool holders having different shapes and dimensions in the same holder. With the present invention, the energy (force and motion) that is applied to the tool can be substantially increased via shear forces by actuators positioned directly on or recessed in pockets on the tool holder as previously described.

BRIEF DESCRIPTION OF THE DRAWINGS

The embodiments of the invention will now be described with reference to the appending drawings, in which.

DETAILED DESCRIPTION

Some concepts as used in the following description will be explained in greater detail, as follows:

Tool holder: In this context referred to as the element holding the tooth. This may be tooth lock, milling tooth, tooth bar with integrated tooth or a combination of tooth block/milling head and adapter, for example.

Tooth: Clamped bit made of hard material with cutting edges removing materials.

Tool: Assembly of tool holder(s) and tooth.

Tool clamping: The member holding the tool. Could be split holder, capto-holder, HSK holder, Steilkon, for example.

Active damping: Damping which is controlled and provided with energy from an external source could be actuators that are controlled by an external micro controller and provided with energy from an external power amplifier, for example. The advantages of using active damping is among other things that basically as much energy as is desired can be supplied to the system, and the possibility of controlling the input by means of adaptive algorithms.

Passive damping: Damping that is not controlled or provided with energy from an external source. Could be actuators that dampen upon electrical losses in a shunt connection built into the system or a mechanical twin mass damper, as described in U.S. Pat. No. 5,413,318.

Modular: A flexible device having inserts adapted to the configuration of the tool holder are included as modules. A module consisting of an insert sleeve having a circular cavity can hold a circular tool of a certain diameter while a module having a rectangular cavity can hold a rectangular tool. A module can also be adapted to the connector part of the tool.

An old principle of mechanical advantage is the moment principle (lever). Using a long lever arm does not require forces of the same magnitude as using a short arm to achieve a moment of the same size. The deflexion as a result of bending forces on a homogeneous cantilever beam is given by $u=SL^3/3EI$, while the deflexion as a result of a bending moment is given by $u=ML^2/2EI$, where S is deflexion force, L is distance from centre, M is moment, E is the modulus of elasticity and I is the second moment of area. When superimposing these equations, it appears that the moment has to be enlarged if a given increase in cutting force arises in order to retain the end of the beam at rest. This moment can be enlarged by increasing the force or the arm of the bending moment. Correspondingly, in torsion the force or arm of the torsion moment or torque has to be increased in order to resist the torque caused by the cutting force.

When directly applying forces radially, a corresponding deflexion is given by $u=FL^3/3EI$, where F is the actuator force.

Comparing the various principles of force transmission shows that both directly applying force and transmitting energy through the lever principle result in an improved energy transmission (larger force and motion) to the tool than transmission via shear forces.

Figure 2A:
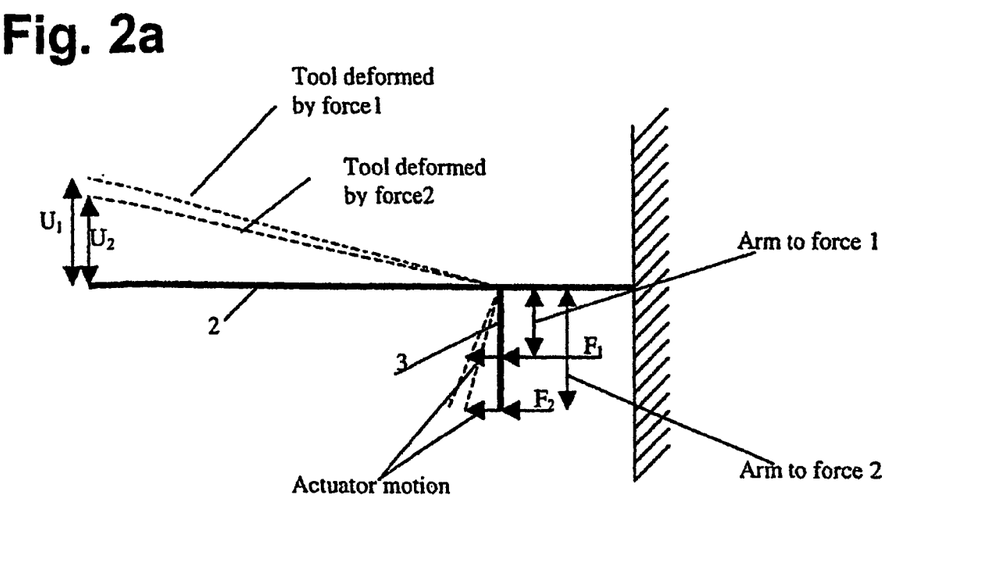
FIG. 2a shows tool flexion by moment transmission.
Figure 2B:
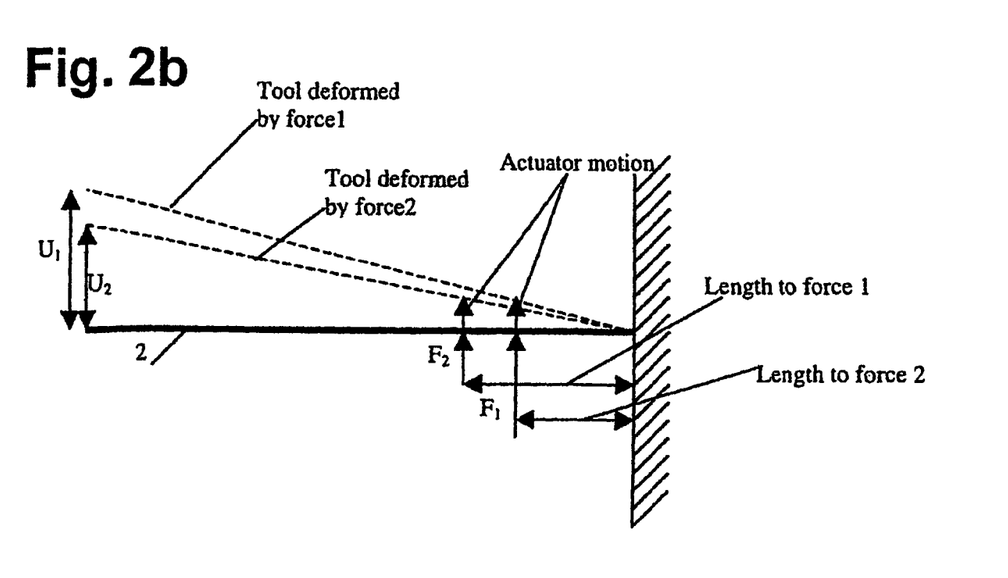
FIG. 2b shows tool flexion by direct force application.

In order to utilize the principles of moment or direct force transmission, one or more force actuators could be used, such as piezoceramic force actuators, stack actuators, hydraulic or pneumatic actuators. These should be positioned in a manner to permit transmission of forces sufficient to achieve the desired motion. In the case of moment transmission, the motion of the tool holder will increase the closer the motion caused by the actuator is relative to the tool holder, but the force required will also increase (see FIG. 2a). In case of direct force transmission, the motion of the tool holder will increase the closer the point of attack of the actuator is to the tool holder clamping. (see FIG. 2b). In both principles the positioning will depend on the size of the tool holder, actuator motion, actuator stiffness and actuator force.

The motion that is applied by the actuators can resist or amplify vibrations/torsions/flexions by orienting the actuators in the direction of interest. Two or more actuators can provide a force couple.

The actuators could be fixed in a locator sleeve mounted on the tool holder, in the connector part of the tool holder (in a flange of a gripper, for example), in the tool holder clamp or integrated in the machine coupling (revolver or spindle/chuck, for example).

In case of the moment transmission principle, a lever for transmitting forces from the actuators is fixed to the tool holder in front of the actuators. This lever should be as rigid as possible in order to transmit moment from the actuators in the best possible manner and should be of low weight in order to add the least possible mass to the natural frequency of the tool. In addition, the lever should have a certain breadth in order to avoid excessive point stresses. In an alternative embodiment, the connector part of the tool holder (see FIG. 7) could be used to transmit the moment to the tool, rather than the lever.

Both the lever and a possible locator sleeve for the actuator(s) can be moved along the tool holder into a desired position. Also, in case of tools not having fixed overhang (non-modular tools), the tool can be moved into and out of the holder. All together, this will result in a considerable flexibility with regard to overhang lengths. With or without the use of insert sleeves, the system could comprise many different tools, in many different embodiments.

By using the principle of direct force transmission, the actuators will add forces by applying them directly onto the tool holder or onto a force transmitting sleeve fixed to the tool holder.

Instead of a force transmission sleeve or lever, a different force transmission device could be used, such as collar, bracket, fork or the like.

The actuators could be actively controlled by using a damping algorithm, for example, and/or passively (shunt), and with or without sensors, in the form of an accelerometer, for example. The system could also be used in combination with other active, for example adaptive mechanical, or passive systems such as mechanical damper. Instead of or in addition to actuators, the invention could utilize passive dampers, such as rubber or hydraulic/pneumatic shock absorbers, for dampening vibrations.

Examples of Embodiments

Force Transmission According to the Moment Principle

Figure 4:
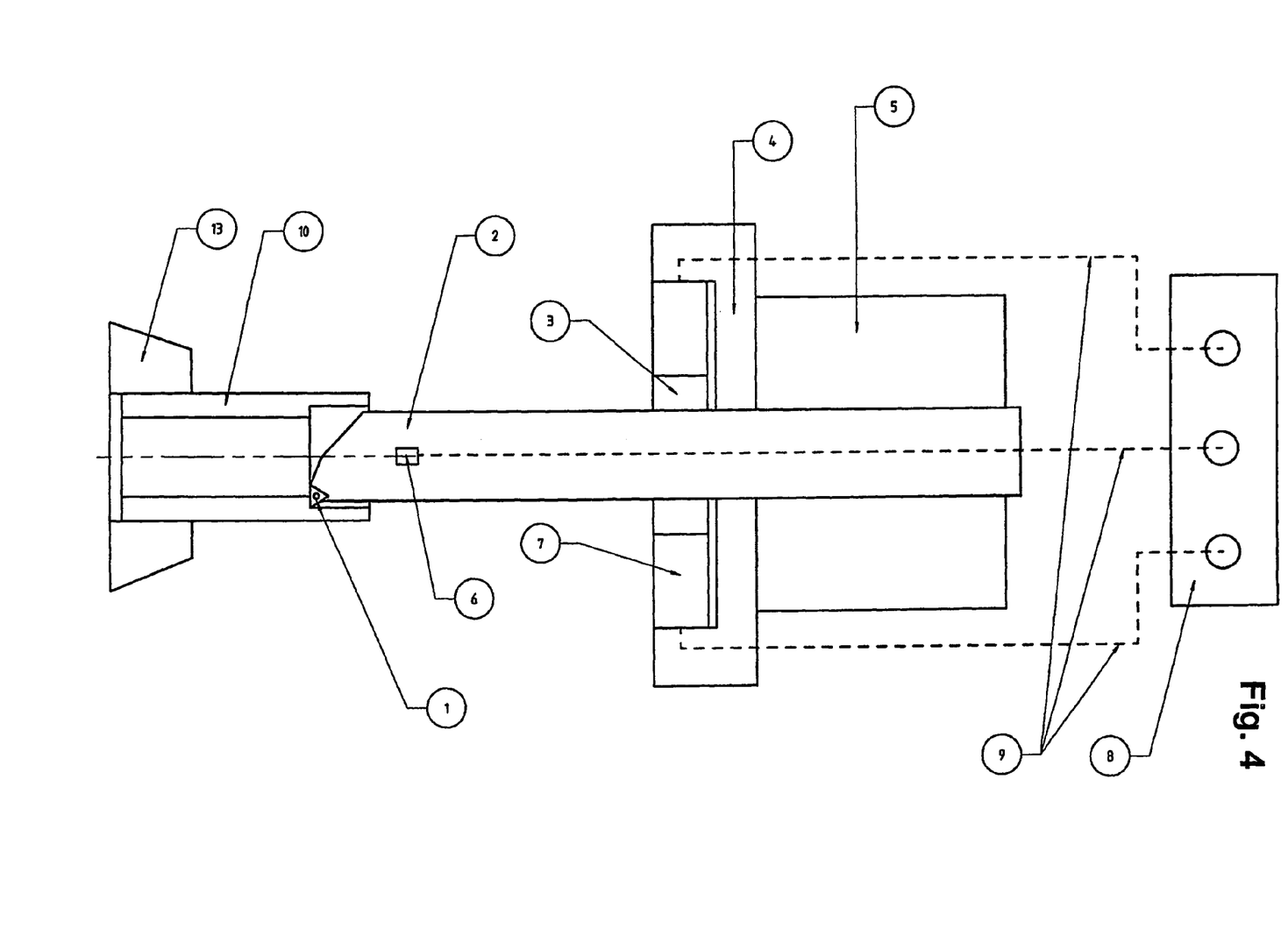
FIG. 4 is a principle sketch of a tool with moment transmission in accordance with one embodiment of the invention.

FIG. 4 shows an embodiment of the damping device according to the invention. A tool holder 2 is placed in a tool clamp 5. A tooth 1 for machining a workpiece 10 is fixed to the tool holder 2. The tool clamp 5 could be modular and adapted to different diameters and geometrical configurations (triangular, oval, square, for example) of the tool holder. Actuators 7 are fixed between the tool clamp 5 or a specific locator sleeve 4 and a lever 14 spaced outwardly from the surface of the tool holder 2. The actuators 7 are fixed to or recessed into the tool clamp 5 on the side facing the tooth 1. Alternatively, the actuators 7 could be fixed to a locator sleeve 4 specific for the actuators. The locator sleeve 4 could be spaced from the tool holder 5, so that the damping device can slide along the bar body. The force from the actuators 7 could act in a manner to deform the tool holder 2 directly, or the tool holder 2 and/or tool clamp 5 could be supported in a manner to permit the motion from the actuators 7 without being deformed.

The lever 14 surrounds the tool holder 2, transferring moment from the actuators 7 to the tool holder 2. For further damping, an elastic material 11, such as rubber, could be disposed as a filler material between the tool holder and the lever 14. In the embodiment that includes a locator sleeve 4 for the actuators 7, the elastic material could be disposed between the lever 14 and the locator sleeve 4. The elastic material could be disposed between actuator 7 and tool holder 2 or disposed at the exterior of the actuators 7.

The actuators 7 could be actively controlled by means of a control unit 8. A sensor 6 for measuring flexion and/or vibration, such as an accelerometer, could be placed on or in the tool holder 2 near the tooth 1. Signals from the accelerometer 6 are transmitted to the control unit 8 on the principle drawing through lines 9 and the control unit 8 could then regulate input to the actuators 7 based on the signals from the sensor. The signals from sensor 6 could also be transmitted by wireless transmission to the control unit.

The actuators could be actively controlled using a damping algorithm, for example, or passively using pneumatic dampers or shunted actuators, for example, and with or without sensors such as in the form of an accelerometer. The system could also be used in combination with other active, such as adaptive mechanical, or passive systems such as mechanical damper. The actuators could be a shaker, a pneumatic or hydraulic actuator, a piezoelectric force actuator or any other force, pressure or torsion actuator.

When using passive actuators 7, the device will act as a damping device in which the vibrations are absorbed from the object rather than actively applying forces to the object. The various structural parts of the damping system would then be the same, but forces would then be transmitted directly or by the moment principle from the object 2 to the actuators 7.

Direct Force Transmission

Figure 5:
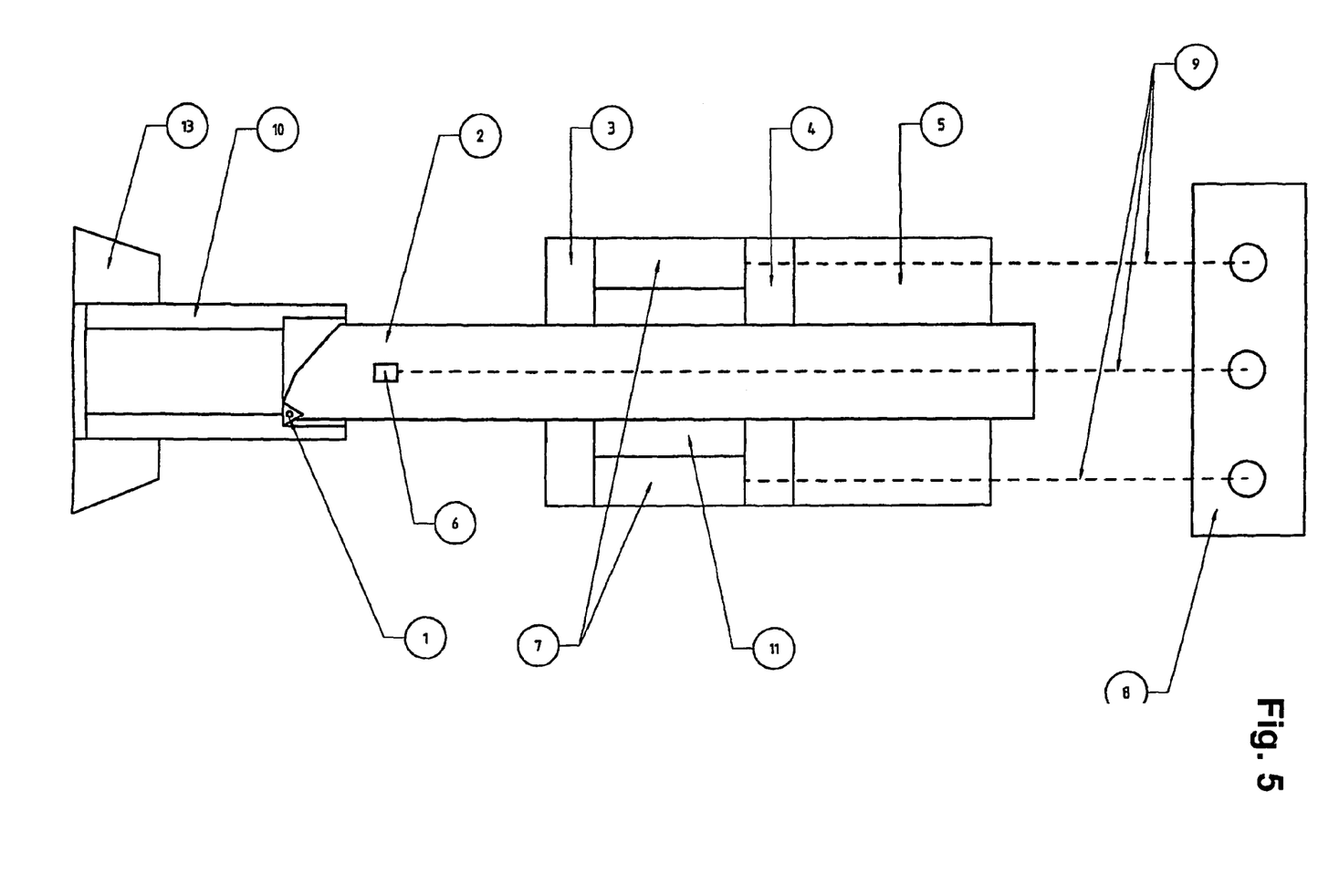
FIG. 5 is a principle sketch of a tool with direct force transmission in accordance with one embodiment of the invention.

FIG. 5 shows an embodiment of the damping device according to the invention. The embodiment offers many points of resemblance with the moment transmission embodiment. In contrast to force transmission according to the moment principle, the forces are usually applied directly to the tool and usually in a radial direction. If the forces are applied to a force transmission sleeve 3 fixed to the tool and the direction of the force applied is oriented more along the length direction of the tool, then the principle would be more similar to the embodiment of moment transmission.

Actuators 7 are fixed between the tool clamp 5 or a specific locator sleeve 4 and the surface of the tool holder 2. The actuators 7 could also transmit forces to the tool holder 2 via a force transmission sleeve 3 surrounding the tool holder 2. The actuators 7 are fixed to the locator sleeve 4 at the side of the tool clamp 5 facing the tooth 1 spaced from the tool clamp 5. The force from the actuators 7 could act in a manner to directly deform the tool holder 2, or the tool holder 2 and/or tool clamp 5 could be supported in a manner to permit the motion from the actuators 7 without being deformed.

The actuators 7 apply forces directly on the tool 2 or a force transmission sleeve 3. For further damping an elastic material 11, e.g. rubber, may be arranged as a filling material between the actuators 7 and the locator sleeve 4.

The actuators 7 can be actively controlled by means of a control unit 8. A sensor 6 for measuring flexion and/or vibration, such as an accelerometer, could be placed on or in the tool holder 2 near the tooth 1. Signals from the accelerometer 6 are transmitted to the control unit 8 on the principle drawing through wire lines 9 and the control unit 8 can then regulate input to the actuators 7 based on the signals from the sensors. The signals from the sensor 6 could also be transmitted by wireless transmission to the control unit.

The actuators could be actively controlled using a damping algorithm, for example, or passively (using pneumatic dampers or shunted actuators, for example), and with or without sensors such as in the form of an accelerometer. The system could also be used in combination with other active, such as adaptive mechanical, or passive systems (such as mechanical damper). The actuators could be a shaker, a pneumatic or hydraulic actuator, a piezoelectric force actuator or any other force, pressure or torsion actuator.

Figure 3:
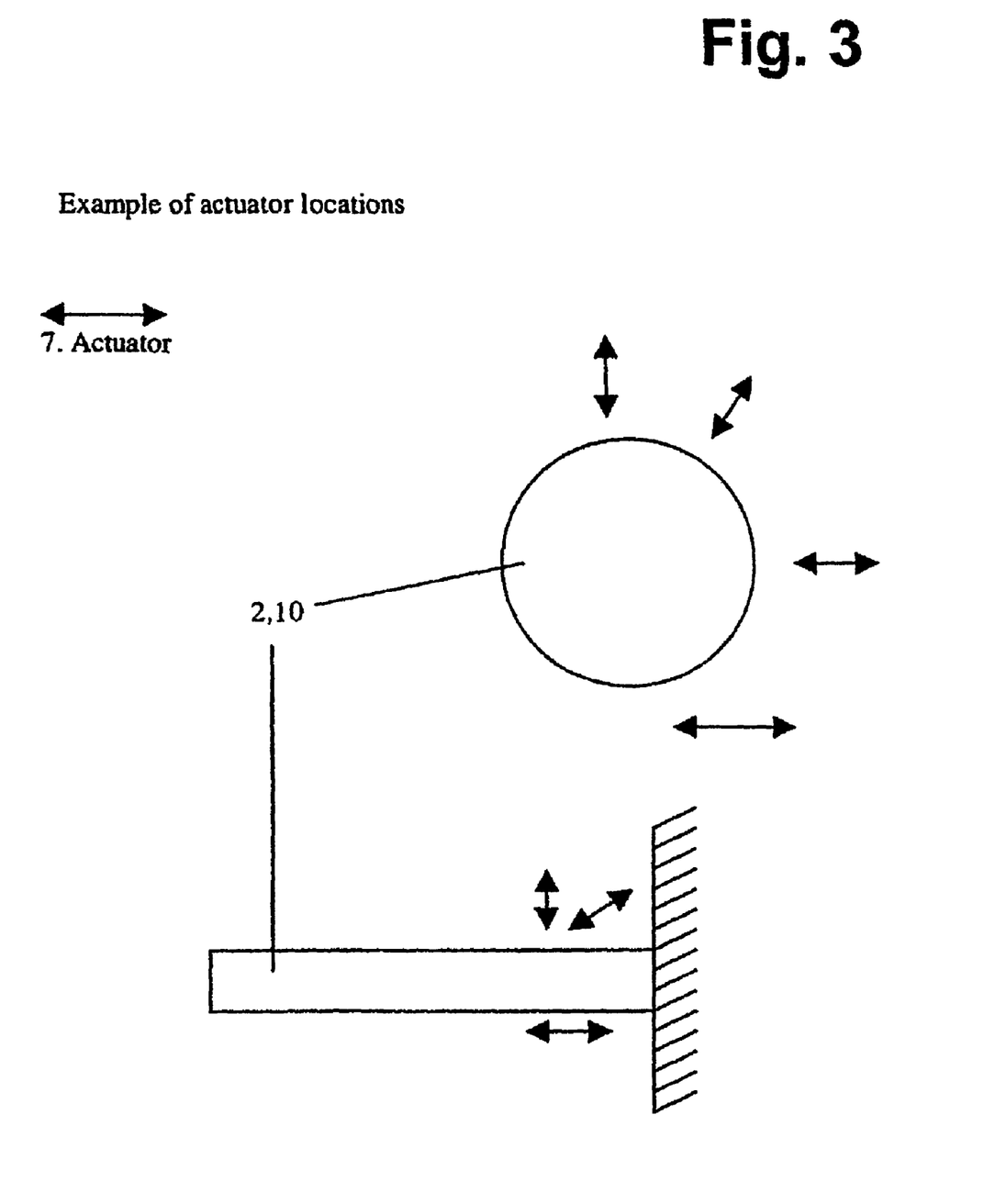
FIG. 3a shows examples of an actuator localisation with force direction and point of attack relative to an object in accordance with various embodiments of the invention.

The force and motion obtained from an actuator may have different orientations and points of attack as shown in FIG. 3. The arrows indicate examples as to how the actuators could be oriented and how the force vectors could attack the tool or workpiece in moment transmission and direct force transmission. Several actuators could be used and larger forces and dissimilar orientation thereof in several desired directions could then be obtained.

As for the damping system shown in FIG. 4, using passive actuators 7 as explained above would also cause the device to act as a damping device in which the vibrations are absorbed from the object rather than actively applying forces to the object. The various structural parts of the damping system would be the same, but forces would then be transmitted directly or through the moment principle from the object 2 to the actuators 7.

Rotary and Non-Rotary Tools

The principles of direct force transmission and moment could be used on rotary (milling, drilling) as well as non-rotary (lathe) tools. In case of non-rotary tools, the tool 2, actuators 7, sleeves 3, 4, 14 and holder 5 are retained at rest while the workpiece 10 is rotating. In case of rotary tools, the workpiece 10 is retained at rest while tool 2 and holder 5 is rotating. Actuators 7, and sleeves 3, 4, 14 could rotate together with the tool, but it could also be retained at rest. If the actuators rotate together with the tool, then signal and energy are transmitted either by wireless transmission or by trailing cables, for example.

Vibration Damping and Flexion of Workpieces

Figure 6:
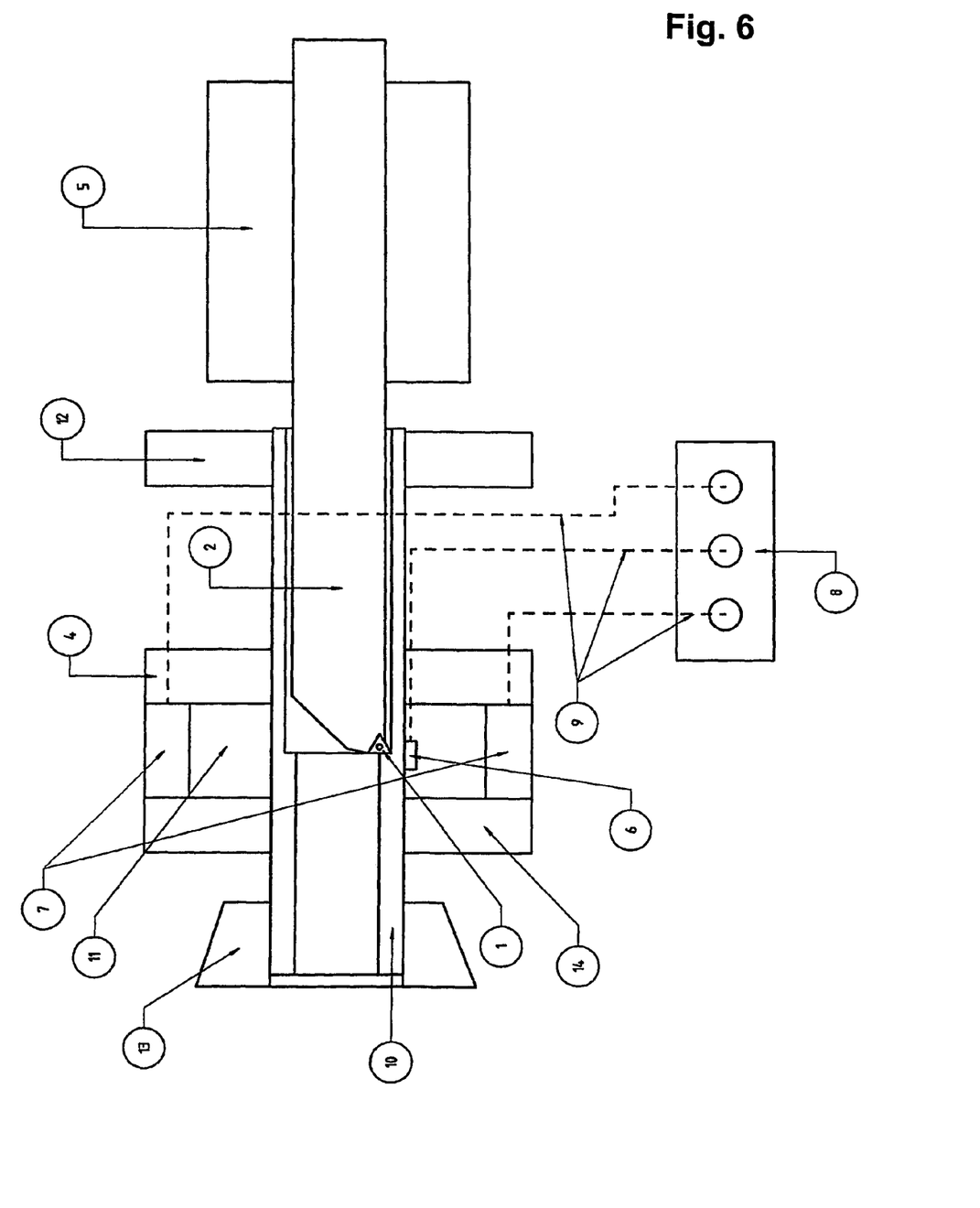
FIG. 6 is a principle sketch of workpiece dampening with moment transmission in accordance with one embodiment of the invention.

FIG. 6 shows an embodiment of a damping device for workpieces according to the invention. In damping of workpieces both the principle of moment transmission and direct force transmission may be used. FIG. 6 illustrates an embodiment in which moment transmission is used.

The workpiece could be clamped in a chuck 13 and a collar plate or rest 12, for example. A damping device according to the invention, based on the moment principle or direct force application surrounds the workpiece 10. A sensor could be attached to or built into the workpiece 10 for detecting vibrations. This embodiment of the damping device is of the same construction as the embodiment shown in FIG. 4 with respect to the localisation of elastic material 11, force actuators 7, and force transmission sleeve 3 or lever 14. However, the entire damping device shown in FIG. 6 is movably arranged on the workpiece, and the locator sleeve 4 is therefore fixed to the elastic material and actuators 7. The actuators may be actively controlled by means of a control unit 8 connected to the damping device via lines 9.

Also in this embodiment passive actuators may be used. These will then absorb vibrations from the workpiece for damping it, rather then actively applying forces on it.

Often, when dealing with thin-walled workpieces or long workpiece overhang, problems will be encountered as a result of vibrations on the workpiece when machined. The problem is encountered both in internal and external machining so that the principle of the damping device is such that it can be mounted both internally and externally on the workpiece.

Figure 7:
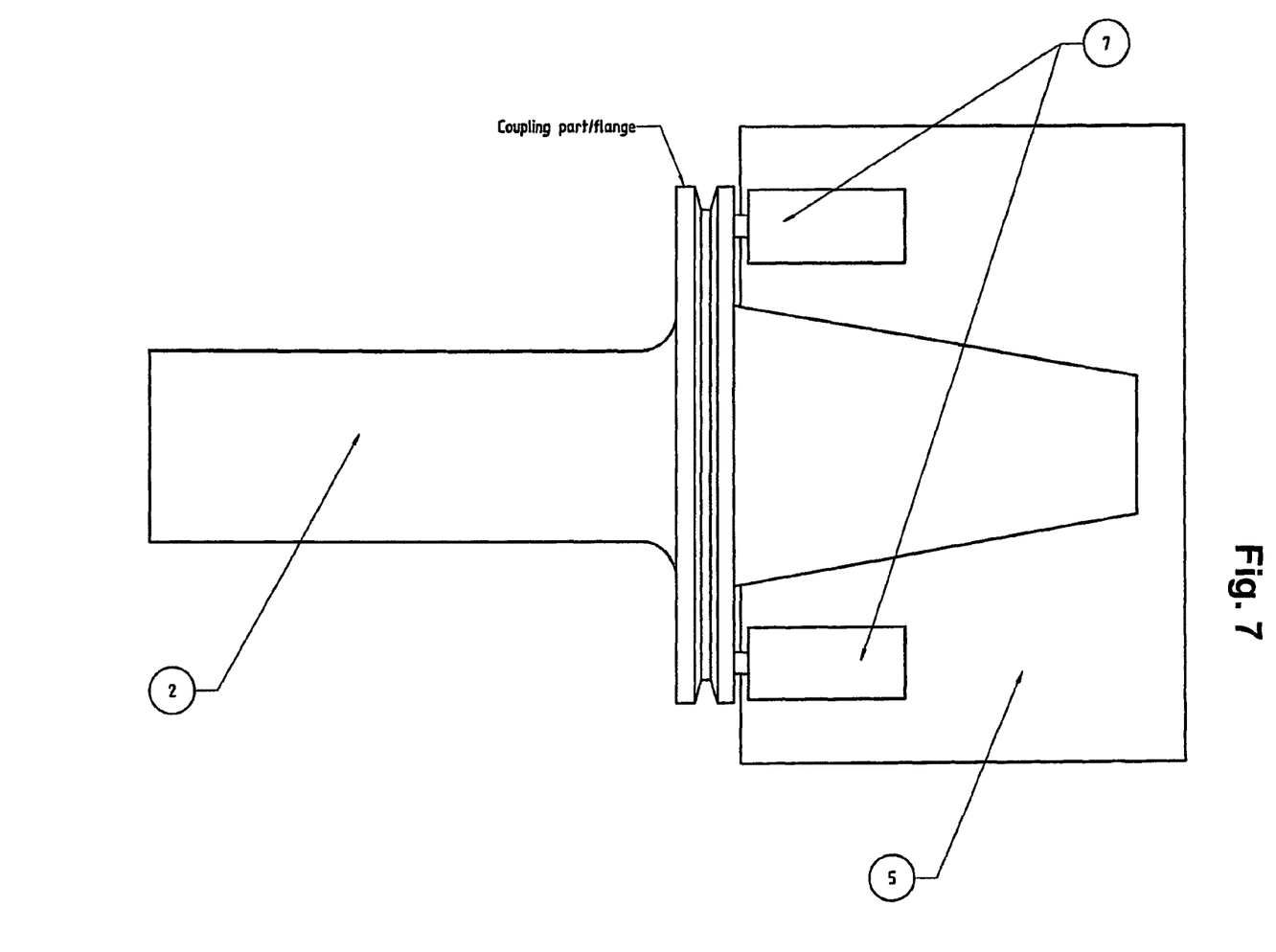
FIG. 7 is an example of an embodiment of the present invention, illustrating how actuators may press directly on a connector part or flange.

FIG. 7 shows an embodiment of the damping device in which the moment transmission occurs via a connector part for the tool holder 2. The connector part connects the tool holder 2 to a clamp 5 for the tool holder. The connector part transmits forces to the tool holder via the moment transmission principle by applying forces from the actuators 7 to the connector part on the outermost edge thereof. A moment is obtained by placing the point of attack of the force beyond the surface of the tool. By moving the actuators outwards from the tool itself, a tool is obtained having a larger possibility of varying the overhang.

Embodiments of the invention are described above. However, it would be obvious to one skilled in the art that the invention could comprise other embodiments, such as defined in the appending patent claims.

The invention claimed is:

1. A device for vibration damping and/or controlling the flexion of an object in machining, wherein the object is a tool, tool holder or workpiece, the device comprising:
at least one force exchange device external of a surface of the object and wherein said force exchange device comprises at least one actuator attached to a locator sleeve and a mechanical lever surrounding the object, the locator sleeve with the at least one actuator and mechanical lever are movable along an outer surface of the object, and wherein the at least one force exchange device is operative to either
exchanging a force having a force component directed at right angle to the surface of the object, or
exchanging directly or via the mechanical lever, a moment between the object and the device.

2. The device according to claim 1, wherein the device further comprising a force transmission device surrounding the object.

3. The device according to claim 2, wherein the force exchange device is disposed between a clamp for the object and the force transmission device, and is fixed to or recessed in the clamp.

4. The device according to claim 2, wherein the force exchange device is disposed between the force transmission device and the locator sleeve.

5. The device according to claim 2, wherein the force exchange device is configured to provide a force having a force component at right angles to the force transmission device while also parallel to the surface of the object.

6. The device according to claim 2, wherein the force transmission device is positioned between said force exchange device and the object.

7. The device according to claim 6, wherein the force transmission device and said force exchange device are positioned in the locator sleeve.

8. The device according to claim 1, wherein the at least one force exchange device exchanges a moment provided by a connector part for the object for fixing the object to a clamp for the object.

9. The device according to claim 8, wherein said force exchange device is positioned in the clamp for the object.

10. The device according to claim 1, wherein it comprises a control unit for regulating input to the at least one actuator.

11. The device according to claim 10, further comprising a sensor to be disposed on or in the object for detecting vibrations in and/or the flexion of the object, said control unit receiving signals from the sensor for regulating the input based on said signals.

12. The device according to claim 11, wherein the sensor is an accelerometer.

13. The device according to claim 1, wherein the actuator is a shaker, a pneumatic and hydraulic actuator, a piezoelectric force actuator or any other force, pressure or torsion actuator.

14. The device according to claim 1, wherein the actuators are adapted to be passively controlled, said actuators being pneumatic dampers or shunted actuators and/or actively using a damping algorithm.

15. The device according to claim 1, wherein the device is modular and permits use of different dimensions and geometrical configurations of the object.

16. The device according to claim 1, wherein said at least one force exchange device is at least one force applying device for applying said force and/or for applying said moment to the object.

17. The device according to claim 1, wherein said at least one force exchange device is at least one damping device for absorbing vibrations from the object, said damping device being adapted to absorb said force component and/or absorb said moment from the object.

18. A device for vibration damping and/or controlling the flexion of an object in machining, the device comprising:
   a locator sleeve having an inner portion and an outer portion, wherein the inner portion is disposed around an outer surface of the object;
   a force transmission sleeve having an inner portion and an outer portion, wherein the inner portion is disposed around the outer surface of the object; and
   at least one force exchange device attached to the outer portion of the locator sleeve and the outer portion of the force transmission sleeve, wherein the locator sleeve, the force transmission sleeve and the at least one force exchange device are movable along the outer surface of the object and wherein the at least one force exchange device is operative to either
      exchange a force having a force component directed at right angle to the surface of the object, or
      exchange directly or via the force transmission sleeve, a moment between the object and the device.

19. The device of claim 18, further comprising a control unit configured to control the at least one force exchange device.

20. The device of claim 19, further comprising a sensor disposed on the object for detecting and sending a signal to the control unit relating to vibration and/or the flexion of the object.

21. A device for vibration damping and/or controlling the flexion of an object in machining, the device comprising:
   a locator sleeve connected to a side of a tool clamp, wherein the tool clamp is attachable to a surface of the object;
   a force transmission sleeve in contact with the object; and
   at least one force exchange device attached between the locator sleeve and the force transmission sleeve, wherein the at least one force exchange device is operative to either
      exchange a force having a force component directed at right angle to the surface of the object, or
      exchange directly or via the force transmission sleeve, a moment between the object and the device.

* * * * *